(12) United States Patent
Davies

(10) Patent No.: US 9,945,460 B2
(45) Date of Patent: Apr. 17, 2018

(54) TORQUE LIMITER

(71) Applicant: GOODRICH ACTUATION SYSTEMS LIMITED, West Midlands (GB)

(72) Inventor: Stephen H. Davies, Shrewsbury (GB)

(73) Assignee: GOODRICH ACTUATION SYSTEMS LIMITED, West Midlands (GB)

( * ) Notice: Subject to any disclaimer, the term of this patent is extended or adjusted under 35 U.S.C. 154(b) by 400 days.

(21) Appl. No.: 14/705,480

(22) Filed: May 6, 2015

(65) Prior Publication Data

US 2015/0330490 A1    Nov. 19, 2015

(30) Foreign Application Priority Data

May 19, 2014  (EP) .................................... 14275124

(51) Int. Cl.
| *F16D 41/064* | (2006.01) |
| *F16H 35/10*  | (2006.01) |
| *F16D 7/00*   | (2006.01) |
| *F16D 13/32*  | (2006.01) |
| *B64C 13/32*  | (2006.01) |

(52) U.S. Cl.
CPC ............ *F16H 35/10* (2013.01); *F16D 7/005* (2013.01); *B64C 13/32* (2013.01); *F16D 2041/0646* (2013.01)

(58) Field of Classification Search
USPC .................................. 192/223, 223.2, 223.3
See application file for complete search history.

(56) References Cited

U.S. PATENT DOCUMENTS

| 4,030,578 A * | 6/1977 | Cacciola ................. B64C 13/28 |
| | | 188/134 |
| 6,692,399 B2 * | 2/2004 | Larson .................... B64C 13/28 |
| | | 475/248 |
| 6,810,656 B2 * | 11/2004 | Kortum .................... F02K 1/763 |
| | | 192/48.7 |

(Continued)

FOREIGN PATENT DOCUMENTS

| EP | 0271355 A2 | 6/1988 |
| EP | 2416035 A1 | 2/2012 |
| GB | 2370077 A  | 6/2002 |

OTHER PUBLICATIONS

European Patent Office Search Report; EP Application No. 14275124.7; dated Nov. 18, 2014; 4 pages.

*Primary Examiner* — Mark A Manley
(74) *Attorney, Agent, or Firm* — Cantor Colburn LLP

(57) ABSTRACT

A torque limiter comprising: a ramp roller, said ramp roller comprising: an input ramp roller element arranged to be driven by an input torque and having a first ramp surface; an output ramp roller element arranged to drive an output torque shaft and having a second ramp surface; ramp roller balls disposed between the first ramp surface and the second ramp surface; wherein said output ramp roller element is axially and resiliently compressible and wherein an overtorque condition causes axial compression of said output ramp roller element. This arrangement removes all axially sliding friction surfaces from the torque limiter so that the torque bandwidth is reduced, allowing manufacturers to design structures more optimally.

15 Claims, 3 Drawing Sheets

(56) References Cited

U.S. PATENT DOCUMENTS

| | | | | |
|---|---|---|---|---|
| 2002/0144876 A1* | 10/2002 | Harvey | ............... | F16D 7/08 |
| | | | | 192/223.3 |
| 2006/0163026 A1 | 7/2006 | Lang | | |
| 2008/0185242 A1* | 8/2008 | Mayer | ............... | F16D 67/00 |
| | | | | 188/181 T |

* cited by examiner

US 9,945,460 B2

TORQUE LIMITER

CROSS REFERENCE TO RELATED APPLICATIONS

This application claims priority to European Patent (EP) application No. 14275124.7 filed May 19, 2014, the entire contents of which are incorporated herein by reference.

BACKGROUND

Torque limiters are used in a number of aircraft systems such as between the power unit and the actuator for control surfaces. Conventional torque limiters include multiple interfaces where friction acts in collaboration with input torque as part of the torque limiter operation. These interfaces are primarily sliding in nature. As a result, repeatability and variance of the product's torque limiter setting is sensitive to the plurality of friction effects. Such torque limiters therefore do not have an exact and consistent torque limit value, but rather have a range of torques in which the limiter's torque limit will lie. Variation occurs in large part due to friction at various points within the torque limiter's mechanism. These will be discussed further below. The torque limiter's range of operation (called its torque bandwidth) will be between a maximum limit value and a minimum limit value. The torque bandwidth dictates the minimum torque that the aircraft manufacturer has to accommodate in the structural design. The aircraft manufacturer needs to use a torque limiter with the minimum limit value sufficiently above the normal operational torque that the limiter is unlikely to cut in during normal operation (as this would then prevent normal operation). However, the manufacturer has to design the equipment to withstand at least the torque at the maximum limit value so as to ensure that it does not break if that torque is actually applied through the limiter. Designing equipment to withstand higher torques requires stronger and usually heavier materials and/or other types of over-engineering (which normally add bulk and weight) and is therefore preferably avoided or minimised. Accordingly, the manufacturer would prefer a torque limiter with a reduced torque bandwidth so as to reduce the required over-engineering.

BRIEF DESCRIPTION

This disclosure relates to torque limiters, in particular reduced friction torque limiters for use in aircraft systems or other high performance systems where weight and manufacturing tolerances are of high importance.

BRIEF DESCRIPTION OF THE DRAWINGS

One or more non-limiting examples will now be described, by way of example only, and with reference to the accompanying figures in which.

DETAILED DESCRIPTION

A detailed description of one or more embodiments of the disclosed apparatus and method are presented herein by way of exemplification and not limitation with reference to the Figures.

Figure 1:
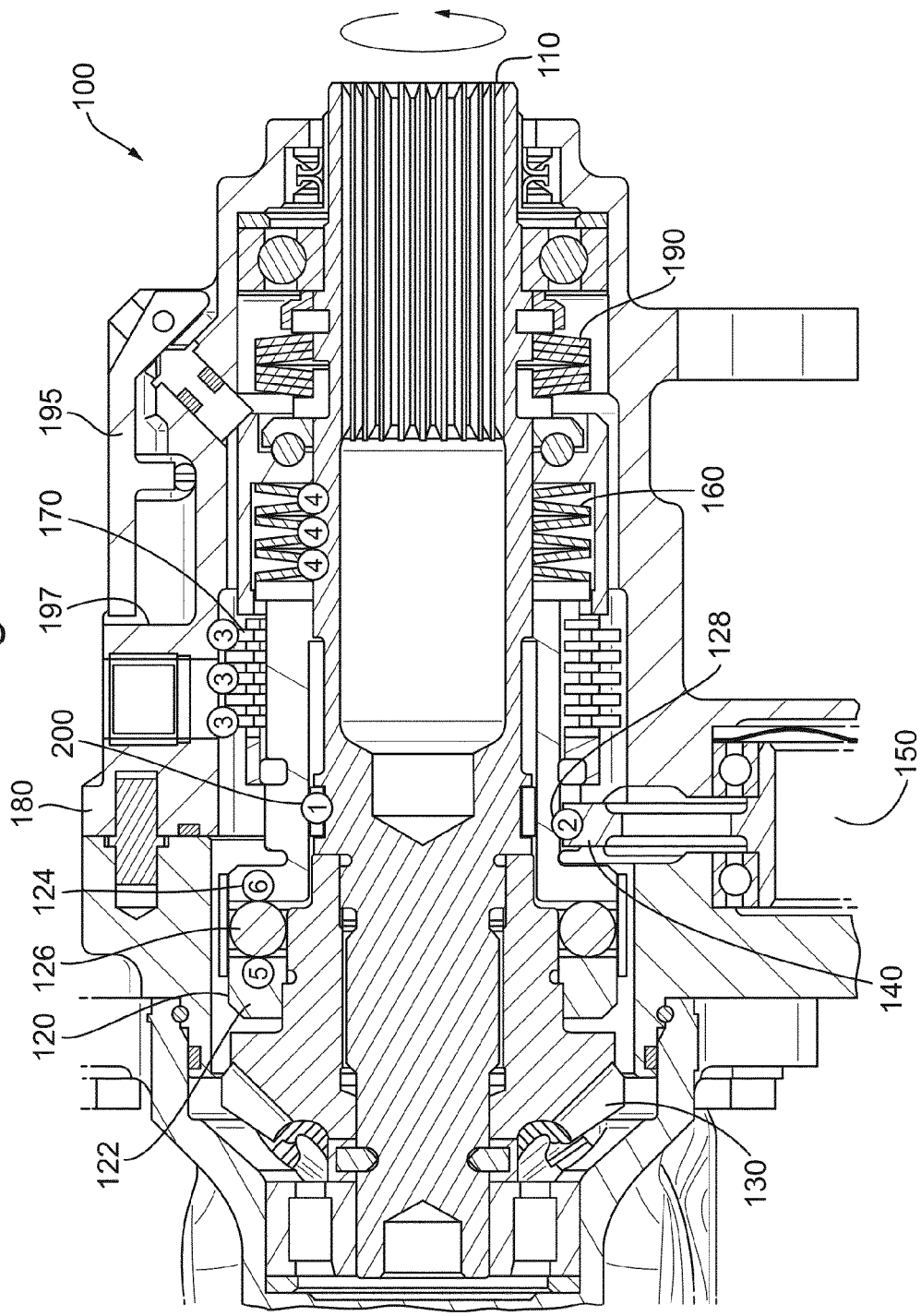
FIG. 1 shows a cross-section of a conventional torque limiter.

A conventional torque limiter 100 is shown in FIG. 1. The input torque enters the unit 100 via a splined shaft 110. This shaft is connected through a first bevel gear 130 which interfaces with a second bevel gear (not shown) and thus transfers torque through the unit to the next transmission shaft and on to the next gearbox (without any torque limitation).

A ramp roller device 120 consists of a ramp roller input 122 and a ramp roller output 124, each containing ramps of equal angle that serve to operate against a plurality of balls 126. The first bevel gear 130 is splined or dogged to the 30 degree ramp roller input 122. The ramp roller output 124 has an integral external gear form 128 and is located on a journal bearing allowing free axial translation to the right (in FIG. 1). The ramp roller output 124 is typically spring loaded to the left (in FIG. 1) via a set of Belleville type springs 160. The spring load from the ramp roller springs 160 serves to compress the ramp roller elements 122, 124, 126 together.

In normal operation, the torque path from actuator input to actuator output is as follows: Input torque into this unit 100 via input torque shaft 110 is transmitted to the ramp roller output 124 via the ramp roller input 122 and the ramp roller balls 126. An output spur gear 140 connects directly to the gearform 128 integral with the ramp roller output 124.

In the event of a jam downstream of the output spur gear 140, the output spur gear 140 will stall into the jam. The input torque on input splined shaft 110 will increase in an effort to break through the jam. Once the preload on the Belleville springs 160 is exceeded, the ramp roller 120 will separate, with the balls 126 rolling up the equal and opposite ramp forms on the input element 122 and the output element 124 and the Belleville washer set 160 will be compressed. The ramp roller output 124 thus translates to the right (in FIG. 1) whilst loaded with torque. During this movement, a sliding action must take place at the interface between the output spur gear 140 and the gearform 128 on the ramp roller output 124.

Following a small displacement of ramp roller output 124 against spring set 160, a set of friction plates 170 are shuffled into hard contact. In the set of friction plates 170, every other plate is splined to the ramp roller output 124 and the remaining plates are keyed to the gearbox housing 180 via slide pins.

As the input torque on shaft 110 continues to increase, the ramp roller 120 continues to develop more axial translation of the ramp roller output 124 and the friction plates 170 attached thereto. This further translation is governed by a second Belleville spring set 190 of much greater preload. Translation against this set of springs 190 serves to mechanically push a red indicator flag 195 out of a detent 197 and thus providing a visual indication of torque limiter lock out which is easily visible to an engineer during maintenance.

Because axial translation of components occurs whilst being loaded with input torque, various interfaces (marked with a numbered circle in FIG. 1) are subject to translation under sliding conditions and while under load. The actual friction coefficient at play at each interface serves to add additional resistance to the axial translation from the ramp roller device 120. Variation of the friction coefficients serves to drive a variation in the actual torque characteristic of the torque limiter (a higher friction increases the torque limiter setting).

The friction at the ramp roller interfaces (indicated by numbered circles 5 and 6 in FIG. 1) is very low as this is a rolling interface. The key sliding interfaces are as follows (with the numbers referring to the numbered circles in FIG. 1):

1) Cylindrical roller bearing 200. While this provides low rolling friction between the inner input shaft 110 (driving the ramp roller input 122) and the ramp roller output 124 in the radial direction, when the ramp roller separates axially, axial sliding friction occurs on this bearing 200.

2) Spur gear interface between spur gear 140 and gearform 128 on ramp roller output 124. This gear interface experiences sliding friction when the ramp roller output 124 (and thus the gearform 128) slides axially when the ramp roller parts 122, 124 separate.

3) The friction plates 170 that are keyed to the housing slide on slide pins and therefore suffer friction under axial movement.

4) The Belleville-type ramp roller spring pack 160 is formed from a number of discs which deform under the axial compression load. These discs are supported on their inside diameter by the input shaft 110. The deformation of these discs causes increased friction with the input shaft 110.

As the friction at each of these interfaces is not fully predictable, the change in friction that occurs during axial movement of the ramp roller device 120 is no predictable and a range of values must be expected depending on the individual components used and the operating conditions. This friction determines the torque at which the unit 100 will be limited and the variation in friction is a large contributor to the torque bandwidth of the device that must be accommodated by the manufacturer as described above.

It is therefore desirable to eliminate or reduce these friction effects that drive the variation in torque limiter performance and repeatability.

According to this disclosure, there is provided a torque limiter comprising: a ramp roller, said ramp roller comprising: an input ramp roller element arranged to be driven by an input torque and having a first ramp surface; an output ramp roller element arranged to drive an output torque shaft and having a second ramp surface; ramp roller balls disposed between the first ramp surface and the second ramp surface; wherein said output ramp roller element is axially and resiliently compressible and wherein an overtorque condition causes axial compression of said output ramp roller element.

By forming the second ramp roller element (i.e. the element that drives the output shaft) as a compressible element itself, the Belleville-type springs (or any other biasing means) of the conventional torque limiter can be made unnecessary. Thus that source of friction is removed from the torque limiter.

Additionally, as the distal axial end of the compressible element (i.e. the end furthest from the ramp roller interface) remains substantially static in the axial direction (axial movement all being taken up by compression between the two axial ends of the output ramp roller element) the bearing support of the output ramp roller element can be located at this distal end, essentially eliminating any sliding friction from such bearings.

These reductions in friction mean that the torque bandwidth of the torque limiter is reduced, i.e. the range in which the torque limit lies is reduced in size. This in turn means that manufacturers the amount of over-engineering of components downstream of the torque limiter. This allows smaller and lighter components to be manufactured and used, leading to further overall efficiencies. In other words, the dramatic reduction in torque limiter setting bandwidth enables the design torque to the aircraft manufacture to be reduced pro-rata thus enabling significant design optimization and weight reduction with respect to aircraft structure. Likewise, the design torque on the downstream gear train is reduced pro-rata thus enabling smaller gear sets and weight. The concept simplifies the design by eliminating multiple spring and friction plate sub systems which directly increase the unit's Mean Time Between Failures (MTBF).

The output ramp roller element preferably comprises an output gear located on the axial end furthest from the input ramp roller element. The output gear preferably does not move substantially in the axial direction during compression of the output ramp roller element. As the output ramp roller element is compressed from the ramp roller interface end, the largest axial movements take place at that axial end of the element. The axial movement experienced by other parts of the output ramp roller element is gradually reduced with increasing axial distance from the interface end such that the opposite axial end (i.e. the end farthest from the interface) experiences substantially no axial movement. Positioning the output drive gear at this end of the output element means that the axial movement caused by the over torque condition does not induce additional friction at the gear interface.

The output gear may be attached to the output ramp roller element in any suitable fashion. This may be desirable where the gear is expected to undergo rapid wear. However, preferably it is integrally formed with the output ramp roller element, thus simplifying manufacture and assembly of the torque limiter. When repair or replacement is required, the output ramp roller element is repaired or replaced as a whole.

It will be appreciated that the output gear may take any suitable form, e.g. a bevel gear, spur gear, helical gear, etc.

The output ramp roller element preferably comprises a brake on the axial end nearest to the input ramp roller element. As discussed above, this is the axial end that experiences greatest axial movement during compression. This axial movement permits the greatest degree of freedom in positioning the braking surface on the output ramp roller element in relation to the opposing brake surface such that the two surfaces can have sufficient clearance during normal operation, but can be quickly brought into contact when an overtorque condition is encountered and compression and axial movement of the output ramp roller element is induced. The engagement of the brake provides resistance to the excess torque applied on the input ramp roller element and prevents that torque from being transmitted through the output ramp roller element to the output torque shaft.

The brake may be a cone brake. Thus the output ramp roller element may have a conical brake flange at its axial end adjacent the ramp roller interface and which interfaces with an opposing conical brake surface on a fixed (non-rotating) surface of the torque limiter. The brake may be a 10 degree cone brake, i.e. with the brake surface being at 10 degrees to the axis of rotation of the second ramp roller element.

The output ramp roller element preferably has a relatively high torsional stiffness and a relatively low axial stiffness. The high torsional stiffness allows rotational movement applied at the axial end proximal to the ramp roller interface to be transmitted with minimal deformation and energy absorption to the opposite distal axial end distal from the ramp roller interface. In some torque limiters, rotation may only be expected in one rotational direction. In such cases, torsional stiffness may only be required in that rotational direction. In other cases, the torque limiter should operate equally in both rotational directions and thus torsional stiffness should be the same in both rotational directions. The low axial stiffness allows the element to compress readily in the axial direction when an overtorque condition is met. It will be appreciated that the term "relatively high" means in comparison with the torques expected under normal operation, i.e. the torsional stiffness is preferably sufficiently high to prevent significant deformation under normal operational torques. Similarly, the term "relatively low" means in comparison to the overtorque condition, i.e. the axial stiffness is preferably sufficiently low to permit significant axial compression movement once the overtorque condition is exceeded.

The output ramp roller element may comprise a hollow cylinder with one or more rings of circumferential slots formed therein, each ring comprising one or more slots extending circumferentially part way round the cylinder. The circumferentially extending slots separate the two axial ends of the output ramp roller element, this separation allowing for movement of one axial end relative to the other axial end, thus permitting compression of the element as a whole.

The torque limiter preferably comprises a plurality of rings of circumferential slots, said rings being axially spaced along the cylinder, each said ring comprising one or more circumferential slots extending circumferentially part way round the cylinder. Multiple rings of slots provides multiple regions for compressibility, thus distributing the compression along the length of the cylinder. The torque limiter may comprise any number of such rings, but preferably at least 2 said rings. The number of rings will be determined according to the size of the torque limiter and the intended forces to be transmitted/not transmitted through the torque limiter. In general, more rings leads to greater control in getting the right spring characteristics. Therefore preferably 4, more preferably 6 or more rings are provided. Some examples, may have up to 10 rings, or may even have more than 10 rings.

Preferably the slot(s) of each ring are circumferentially offset in relation to the slot(s) of adjacent rings. This arrangement facilitates better and more uniform compressibility as the material circumferentially separating the slots (or, in the case of a single slot, one end of the slot from the other end) may then be positioned axially adjacent to a neighbouring slot into which it can deflect axially during compression.

The or each ring may comprise a plurality of slots which together extend part way round the cylinder. The slots are preferably symmetrically arranged around the ring and preferably all of the same length (although this need not necessarily be the case). The or each ring may comprise two slots. The or each ring may comprise four slots or six slots or more slots.

The slots within a ring preferably take up at least 80% of the ring, more preferably at least 90% of the ring. A smaller amount of material remaining in the ring will lead to a greater axial compliance, i.e. a less stiff spring. If the slots take up much less than 80% of the circumference, the spring will be too stiff for many applications, such as aircraft control actuators (although it will be appreciated that this may still be useful in other applications).

According to another aspect of this disclosure, there is provided a method of limiting torque transmission comprising: applying an input torque to an input ramp roller element of a ramp roller device in excess of a torque limit; the torque causing an output ramp roller element of said ramp roller device to compress axially and resiliently thereby engaging a braking surface of said output ramp roller element with an opposed braking surface to resist the excess torque; and an output gear on the output ramp roller element remaining substantially static in the axial direction during compression of the output ramp roller element.

It will be appreciated that all of the preferred features described above in relation to the apparatus, apply equally to the method of limiting torque transmission.

FIG. 1 shows a cross-section of a conventional torque limiter and has been described above.

Figure 2:
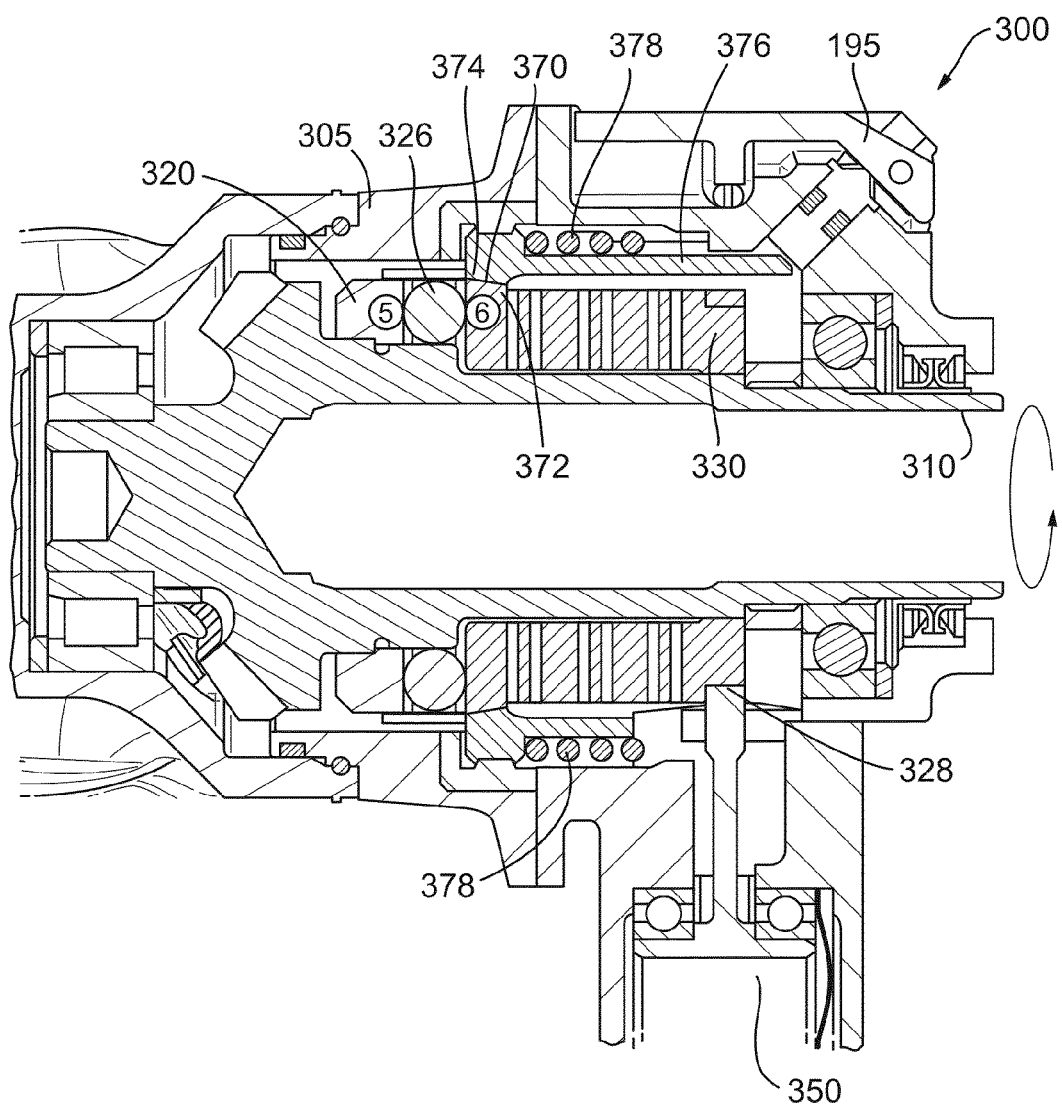
FIG. 2 shows a cross-section of a low friction torque limiter.

FIG. 2 shows a cross-section of a reduced friction torque limiter 300. Compared with the conventional torque limiter 100 shown in FIG. 1, the input shaft 310 and input ramp roller element 320 of this example are essentially the same. They operates as before in receiving the input torque and developing axial translation at a given input torque value. However the output ramp roller element 330 is significantly altered in comparison with the conventional torque limiter 100 shown in FIG. 1. The output ramp roller element 330 now forms a combination spring/gear element. The output ramp roller element is shown in more detail in FIGS. 3 and 4.

It can be seen that the sliding journal bearing 200 of the conventional torque limiter 100 has been eliminated and the output spur gear 350 has been repositioned to the far right (as shown in FIG. 2) end 322 of the ramp roller output element 320, i.e. the end distal from the ramp roller interface and the ramp roller balls 326.

Figure 4:
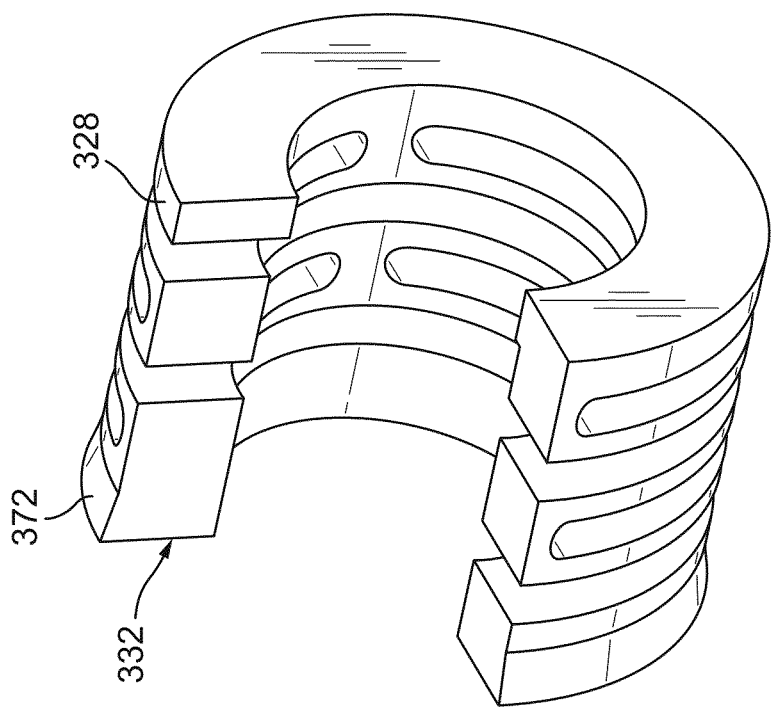
FIG. 4 shows a partial cutaway of a spring component of a low friction torque limiter.
Figure 3:
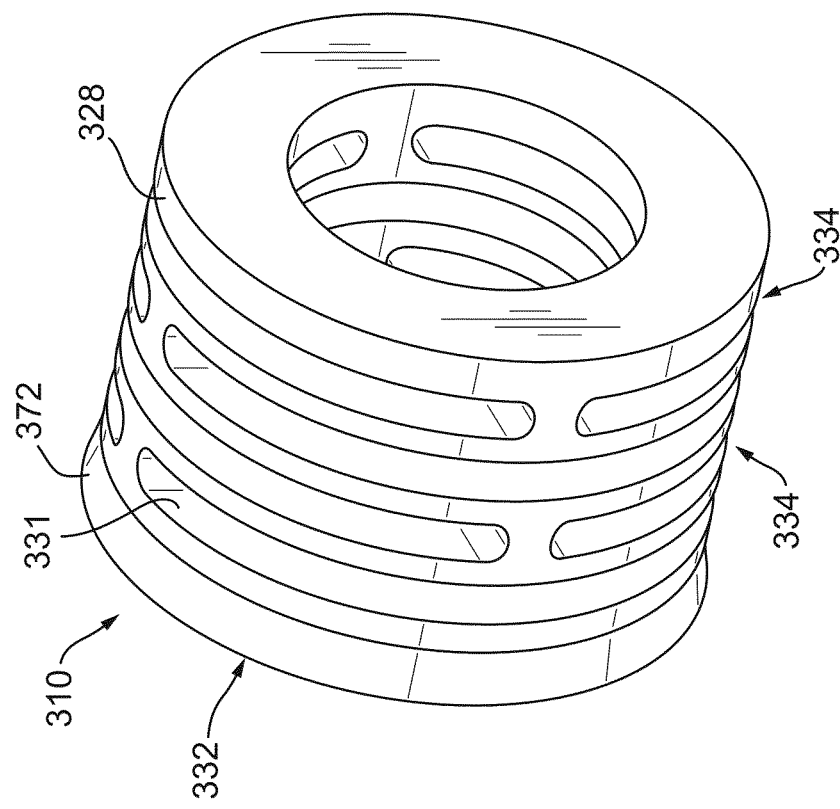
FIG. 3 a spring component of a low friction torque limiter.

As shown in FIGS. 3 and 4, the ramp roller output element 330 incorporates a set of slots 331 that extend circumferentially around the element 330 and serve to develop a mechanical spring characteristic in the component 330 in the region between the ramp roller ball ramp 332 and the spur gear output (not shown, but indicated at 328).

The slots 331 in the ramp roller output element 330 are designed to provide the required mix of:
- Low axial stiffness characteristic to enable axial translation under ramp roller action; and
- High torsional stiffness characteristic to serve as the torque path to the output spur gear.

The example shown in FIGS. 3 and 4 contains four circumferential rings 334, each of which has two slots 331 (note that the example shown in FIG. 2 has six circumferential rings 334, each with two slots 331). The two slots 331 of a single ring 334 are symmetrically arranged and of equal length such that they form a broken circle with the two breaks diametrically opposed. The slots 331 together extend around the majority of the circumference of the element 330. In this example they extend around over 90% of the circumference. Adjacent rings 334 have their slots 331 offset with respect to one another so that the slots 331 of adjacent rings 334 overlap and together extend around the full circumference of the element 330. The offset is symmetrical.

As the ramp roller 320 develops axial translation, the ramp roller output element 330 compresses, but the gear interface 328 with the spur output gear 350 remains axially static. As the ramp roller output element 330 has an integral mechanical spring form, it completely eliminates the Belleville spring set 160 of the conventional torque limiter 100 and thus also eliminates the associated sliding interfaces of that conventional design. This reduction in friction reduces the torque bandwidth of the torque limiter device and thus allows downstream components to be engineered with reduced tolerances, which in turn means that they can be made lighter, smaller and more efficient.

The plurality of friction plates 170 of the conventional torque limiter 100 and the associated sliding interfaces of those plates 170 are also completely replaced in this example with a single surface cone brake 370. The ramp roller output element 330 incorporates the male conical form 372. The female conical form 374 is provided as part of a component which is splined to the unit housing 305. No axial translation of the brake arm 376 occurs when the cone brake 370 is engaged (via ramp roller output element translation). Thus the torque limiter lock out to earth is effected with no sliding surfaces in play.

As the torque continues to increase beyond the preload acting on the brake arm 376 (the preload being provided by coil spring 378), the brake arm 376 will translate to the right (as shown in FIG. 1) via further translation ramp roller output element 330 to trigger the same red visual indicator 195 as in the conventional design 100 of FIG. 1.

This example removes the following sliding friction surfaces of the conventional torque limiter 100 discussed above: the cylindrical roller bearing 200, the spur gear interface 128/150, the brake discs 170 and the Belleville spring pack 160. This great reduction in friction not only improves the efficiency of the torque limiter, but more importantly reduces the performance variation, thus reducing the range of values (the bandwidth) that the torque limit of the device 300 may take.

A comparison of friction values at the various bearing surfaces in the conventional torque limiter shown in FIG. 1 and the reduced friction torque limiter of FIG. 2 is provided in the following two tables:

TABLE 1

Conventional torque limiter (FIG. 1)

| Interface identifier | Interface description | Motion | Load | Friction Value |
|---|---|---|---|---|
| 1 | Cylindrical rolling bearing | Kinetic, Axial-Sliding | High - Output Spur Separation | 0.03-0.12 |
| 2 | Spur gear tooth | Kinetic, Axial-Sliding | High - Output Spur Separation | 0.03-0.12 |
| 3 | Static Brake Discs onto Guide Pins | Kinetic, Axial-Sliding | High - Output Torque Reaction | 0.03-0.12 |
| 4 | Disc Spring Guidance on inside diameter | Kinetic, Axial-Sliding | Low | 0.03-0.12 |
| 5 | Input Ball Ramp | Rolling | High | 0.005 |
| 6 | Output Ball Ramp | Rolling | High | 0.005 |
|  |  |  | Min High Sum | 0.1 |
|  |  |  | Max High Sum | 0.37 |
|  |  |  | Scatter Factor | 0.27 |

TABLE 2

Reduced friction torque limiter (FIG. 2)

| Interface identifier | Interface description | Motion | Load | Friction Value |
|---|---|---|---|---|
| 1 | Cylindrical rolling bearing | Deleted |  |  |
| 2 | Spur gear tooth | Deleted |  |  |
| 3 | Static Brake Discs onto Guide Pins | Deleted |  |  |

TABLE 2-continued

Reduced friction torque limiter (FIG. 2)

| Interface identifier | Interface description | Motion | Load | Friction Value |
|---|---|---|---|---|
| 4 | Disc Spring Guidance on inside diameter | Deleted |  |  |
| 5 | Input Ball Ramp | Rolling | High | 0.005 |
| 6 | Output Ball Ramp | Rolling | High | 0.005 |
|  |  |  | Min High Sum | 0.1 |
|  |  |  | Max High Sum | 0.1 |
|  |  |  | Scatter Factor | 0 |

In the above two tables, the friction associated with each interface is described. The values Min High Sum and Max High Sum are the sums of the minimum and maximum friction values at interfaces under high load (because the contribution from the low load interface is negligible and can be ignored). The Scatter Factor is the difference between the Min High Sum and the Max High Sum and indicates the variation in performance of the torque limiter due to friction.

It can be seen that the conventional torque limiter (FIG. 1 and Table 1) has a scatter value of 0.27 indicating a significant variation in performance, while the reduced friction torque limiter has a scatter factor of 0 representing no (or rather negligible) friction variation. The variation in this example is negligible as the variation in friction value on the rolling interfaces is negligible.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed:

1. A torque limiter comprising:
   a ramp roller, said ramp roller comprising:
      an input ramp roller element arranged to be driven by an input torque and having a first ramp surface;
      an output ramp roller element arranged to drive an output torque shaft and having a second ramp surface;
      ramp roller balls disposed between the first ramp surface and the second ramp surface;

wherein said output ramp roller element is axially and resiliently compressible and wherein an overtorque condition causes axial compression of said output ramp roller element.

2. A torque limiter as claimed in claim 1, wherein the output ramp roller element comprises an output gear located on the axial end furthest from the input ramp roller element.

3. A torque limiter as claimed in claim 1, wherein the output ramp roller element comprises a brake on the axial end nearest to the input ramp roller element.

4. A torque limiter as claimed in claim 1, wherein the output ramp roller element has a relatively high torsional stiffness and a relatively low axial stiffness.

5. A torque limiter as claimed in claim 1, wherein said output ramp roller element comprises a hollow cylinder with one or more rings of circumferential slots formed therein, each ring comprising one or more slots extending circumferentially part way round the cylinder.

6. A torque limiter as claimed in claim 5, comprising a plurality of rings of circumferential slots, said rings being axially spaced along the cylinder, each said ring comprising one or more circumferential slots extending circumferentially part way round the cylinder.

7. A torque limiter as claimed in claim 6, comprising at least 2, rings.

8. A torque limiter as claimed in claim 6, wherein the slot(s) of each ring or circumferentially offset in relation to the slot(s) of adjacent rings.

9. A torque limiter as claimed in claim 5, wherein the or each ring comprises a plurality of slots which together extend part way round the cylinder.

10. A torque limiter as claimed in claim 5, wherein the or each ring comprises two slots.

11. A torque limiter as claimed claim 5, wherein the or each ring comprises four slots.

12. A torque limiter as claimed in claim 10, wherein the slots of a ring are symmetrically arranged around the ring.

13. A torque limiter as claimed in claim 9, wherein the slots within a ring take up at least 80% of the circumference of the ring.

14. A torque limiter as claimed in claim 9, wherein the slots within a ring take up at least 90% of the circumference of the ring.

15. A method of limiting torque transmission comprising:
applying an input torque to an input ramp roller element of a ramp roller device in excess of a torque limit;
the torque causing an output ramp roller element of said ramp roller device to compress axially and resiliently thereby engaging a braking surface of said output ramp roller element with an opposed braking surface to resist the excess torque; and
an output gear on the output ramp roller element remaining substantially static in the axial direction during compression of the output ramp roller element.

* * * * *